US010407116B2

(12) United States Patent
Mohamed et al.

(10) Patent No.: US 10,407,116 B2
(45) Date of Patent: Sep. 10, 2019

(54) ELECTRONIC SECURITY SYSTEM FOR BICYCLE

(71) Applicant: LINKA GROUP LTD., Hong Kong (HK)

(72) Inventors: Mohamed Mohamed, Astoria, NY (US); Brendan Lake, Venice, CA (US)

( * ) Notice: Subject to any disclaimer, the term of this patent is extended or adjusted under 35 U.S.C. 154(b) by 224 days.

(21) Appl. No.: 15/675,790

(22) Filed: Aug. 14, 2017

(65) Prior Publication Data

US 2019/0047646 A1 Feb. 14, 2019

(51) Int. Cl.

| | |
|---|---|
| ***G08B 13/12*** | (2006.01) |
| ***B62H 5/20*** | (2006.01) |
| ***B62H 5/00*** | (2006.01) |
| ***B60R 25/40*** | (2013.01) |
| ***B60R 25/102*** | (2013.01) |
| ***G07C 9/00*** | (2006.01) |
| *H04W 12/08* | (2009.01) |

(52) U.S. Cl.

CPC ............ *B62H 5/20* (2013.01); *B60R 25/102* (2013.01); *B60R 25/40* (2013.01); *B62H 5/003* (2013.01); *G07C 9/00309* (2013.01); *G07C 9/00896* (2013.01); *G07C 2009/00642* (2013.01); *H04W 12/08* (2013.01)

(58) Field of Classification Search

CPC ....... E05B 67/003; E05B 71/00; B60R 25/09; B62H 5/003; B62H 3/00; B62H 1/00

USPC ....... 340/427, 5.2, 432; 70/30, 49, 225, 226, 70/233–235

See application file for complete search history.

(56) References Cited

U.S. PATENT DOCUMENTS 5,061,499 A 10/1991 Holloway, Jr. et al.
2011/0148346 A1 6/2011 Gagosz et al.
2013/0150028 A1 6/2013 Akins et al.
2013/0255335 A1* 10/2013 Jonely ................ E05B 47/0001 70/277
2013/0314205 A1* 11/2013 Neupert .................. B62M 6/40 340/5.2
2015/0074004 A1* 3/2015 Song .................. G07F 17/0057 705/307

(Continued)

*Primary Examiner* — Firmin Backer
*Assistant Examiner* — Munear Akki
(74) *Attorney, Agent, or Firm* — Kanika Radhakrishnan; Evergreen Valley Law Group

(57) ABSTRACT

An electronic security system for a bicycle includes an electronic security device, first connector and second connector. Electronic security device is disposed on frame of bicycle for securing bicycle and includes first rechargeable battery and first security circuit. First connector is disposed on electronic security device and includes first engagement member. Second connector includes first end portion, second end portion, second engagement member, second security circuit and second rechargeable battery disposed between first end portion and second end portion. Second end portion is connected to an anchoring device of a plurality of types of anchoring devices. Second engagement member is configured on first end portion and engages with first engagement member for charging first rechargeable battery by second rechargeable battery. First security circuit and second security circuit detect type of anchoring device when second and first engagement member engage and provide information of type of anchoring device to external system.

24 Claims, 11 Drawing Sheets

(56) References Cited

U.S. PATENT DOCUMENTS

| | | | | |
|---|---|---|---|---|
| 2015/0211262 | A1 | 6/2015 | Leung | |
| 2015/0292244 | A1* | 10/2015 | Beatty | E05B 47/0012 70/20 |

* cited by examiner

ELECTRONIC SECURITY SYSTEM FOR BICYCLE

TECHNICAL FIELD

The present invention relates to a security device for a bicycle and, more particularly, to an electronic security system for the bicycle.

BACKGROUND

Conventionally, locks such as chains, foldable locks and cables are used to prevent theft of bicycles. Although, the chains are heavy and difficult to carry, they provide great security for bicycles while cables provide poor security but are lightweight and easy to carry.

Recently, electronic security devices have been employed to secure bicycles. However, employment of the electronic security devices is deterred by battery lifetime and long charging time of the battery. Further, such electronic security devices have poor battery life and do not have an effective alternative charging means, thereby making the process of charging the security device a time consuming process for a rider/user of the bicycle. Moreover, unlocking bicycles when the environment is dark is difficult. Furthermore, insurance companies providing insurance coverage against theft of the bicycles are also interested in information of a type of security device and anchoring means used for parking the bicycle by the users. The current conventional and electronic security devices do not provide such information to an insurance company.

In view of the above, there is a requirement for an electronic security system that ensures easy charging of the battery and provides high level of security for the bicycle in addition to being capable of providing information to the insurance companies regarding type of anchoring device used for parking the bicycle.

SUMMARY

In an embodiment, an electronic security system for a bicycle is disclosed. The electronic security system includes an electronic security device, a first connector and a second connector. The electronic security device is disposed on a frame of the bicycle for securing the bicycle. The electronic security device includes a first rechargeable battery and a first security circuit. The first connector is disposed on the electronic security device. The first connector includes a first engagement member. The second connector includes a first end portion and a second end portion, a second rechargeable battery, a second engagement member and a second security circuit. The second end portion is configured to be connected to an anchoring device of a plurality of types of the anchoring devices. The second rechargeable battery is disposed between the first end portion and the second end portion. The second engagement member is configured on the first end portion. The second engagement member is configured to engage with the first engagement member for charging the first rechargeable battery by the second rechargeable battery. The first security circuit and the second security circuit are configured to detect a type of the anchoring device when the second engagement member engages with the first engagement member and provides information of type of the anchoring device to an external system.

In another embodiment, an electronic security system for a bicycle is disclosed. The electronic security system includes an electronic security device, a first connector and a second connector. The electronic security device is disposed on a frame of the bicycle for securing the bicycle. The electronic security device includes a first rechargeable battery and a first security circuit. The first connector is disposed on the frame of the bicycle. The first connector includes a first engagement member electrically coupled with the electronic security device. The second connector includes a first end portion and a second end portion, a second rechargeable battery, a second engagement member and a second security circuit. The second end portion is configured to be connected to an anchoring device of a plurality of types of the anchoring devices. The second rechargeable battery is disposed between the first end portion and the second end portion. The second engagement member is configured on the first end portion. The second engagement member is configured to engage with the first engagement member for charging the first rechargeable battery by the second rechargeable battery. The first security circuit and the second security circuit are configured to detect a type of the anchoring device when the second engagement member engages with the first engagement member and provide information of type of the anchoring device to an external system.

In another embodiment, an electronic security system for a bicycle is disclosed. The electronic security system includes an electronic security device, a first connector and a second connector. The electronic security device is disposed on a frame of the bicycle for securing the bicycle. The electronic security device includes a first rechargeable battery and a first security circuit. The first connector is disposed on the electronic security device. The first connector includes a first engagement member. The second connector includes a first end portion, a second end portion, a second rechargeable battery, a second engagement member and a second security circuit. The second rechargeable battery is disposed between the first end portion and the second end portion. The second engagement member is configured on the first end portion. The second engagement member is configured to engage with the first engagement member for charging the first rechargeable battery by the second rechargeable battery. The first security circuit and the second security circuit are configured to authenticate the second connector to enable engagement of the second engagement member with the first engagement member.

BRIEF DESCRIPTION OF THE FIGURES

The invention itself, together with further features and attended advantages, will become apparent from consideration of the following detailed description, taken in conjunction with the accompanying drawings. One or more embodiments of the present invention are now described, by way of example/s only, with reference to the accompanied drawings wherein like reference numerals represent like elements and in which.

Figure 1:
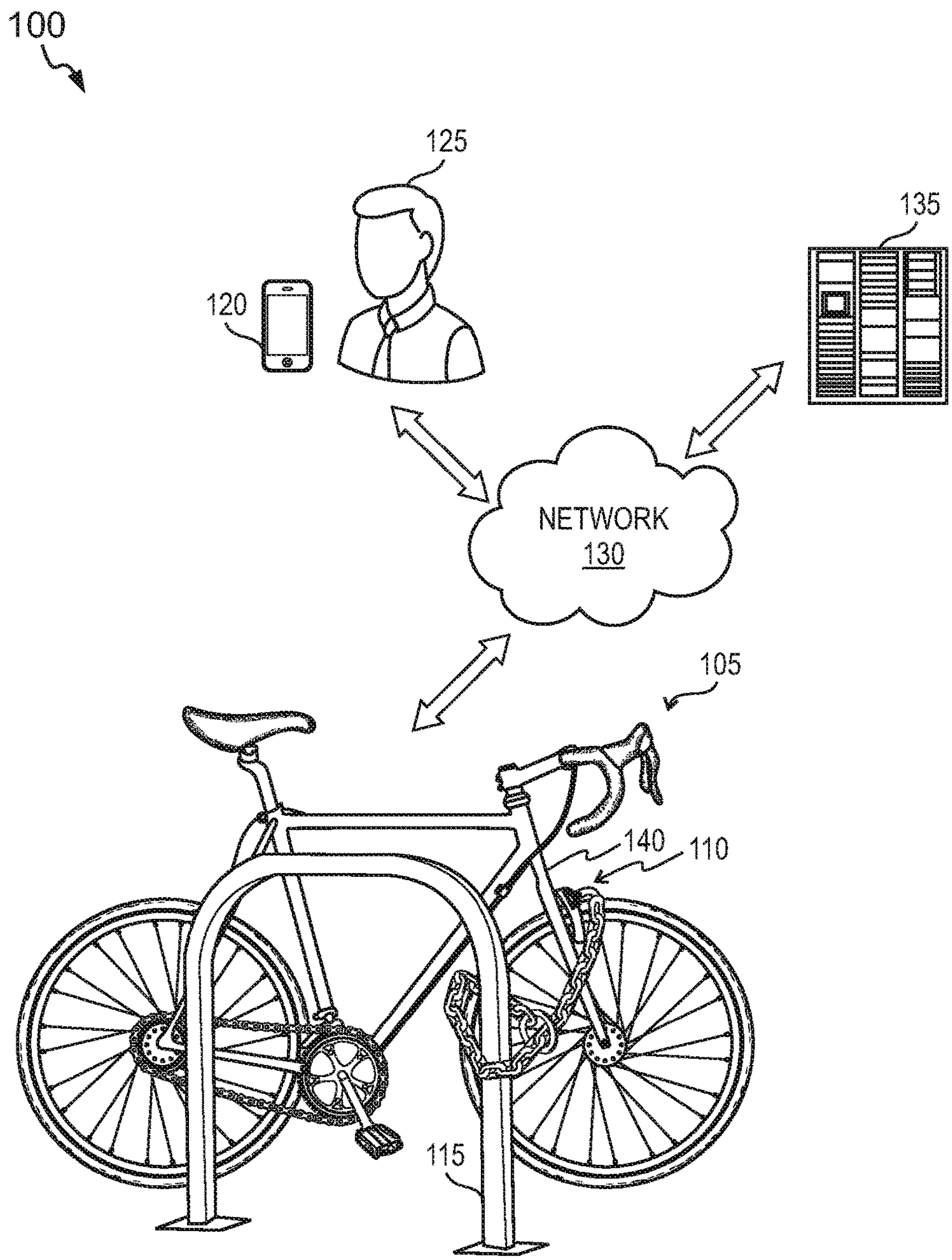
FIG. 1 illustrates an environment related to at least some example embodiments of the present disclosure.

The drawings referred to in this description are not to be understood as being drawn to scale except if specifically noted, and such drawings are only exemplary in nature.

DETAILED DESCRIPTION OF THE FIGURES

While the invention is susceptible to various modifications and alternative forms. Specific embodiments thereof have been shown with the help of examples in the drawings and are described in detail below. It should be understood, however that it is not intended to limit the invention to the particular forms disclosed, but on the contrary, the invention is to cover all modifications, equivalents, and alternative fallings within the spirit and the scope of the invention.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. For the better understanding of this disclosure, reference will now be made to the embodiments illustrated in greater depth in the accompanying figures and description given below. In the following figures, the same reference numerals are used to identify the same components in various views.

Various embodiments provide different configurations of an electronic security system for a bicycle. The objective of the electronic security system is to protect the bicycle from theft, to communicate with an external system and/or include an alternative charging means. The external system is at least one of an external server of an insurance provider or a user device associated with a user of the bicycle. The electronic security system includes an electronic security device, a first connector and a second connector. For the purpose of the present disclosure, the terms 'user' and 'rider' have been used interchangeably throughout the present description and refer to a person accessing the electronic security system to lock/unlock the electronic security device that secures the bicycle.

The electronic security device is disposed on a frame of the bicycle. The electronic security device includes a first rechargeable battery, a first security circuit and an integrated bike lock. The first rechargeable battery acts as a power source for the electronic security device. The integrated bike lock is configured to assume an open position and a locked position, such that in the locked position the integrated bike lock restricts motion of the bicycle and in the open position the integrated bike lock allows free motion of the bicycle.

In an embodiment, the first connector is disposed on the electronic security device. Alternatively or additionally, the first connector is disposed on the frame of the bicycle and electrically coupled to the electronic security device. The first connector includes a first engagement member. The first engagement member includes a plurality of pin connectors and one or more notches for engaging with the second connector.

The second connector includes a second rechargeable battery, a second security circuit and a second engagement member. The second connector engages with the first connector to form an electro-mechanical connection between the first connector and the second connector by engaging the second engagement member with the first engagement member. The second rechargeable battery is configured to charge the first rechargeable battery of the electronic security device when the second connector is engaged with the first connector. The second connector is configured to be connected to an anchoring device of a plurality of types of the anchoring devices (e.g., a chain, a cable or a foldable lock) for tethering the bicycle to a dock. In an example embodiment, the second connector can only act as a battery pack for charging the second rechargeable battery, since the second connector includes the rechargeable battery.

The first security circuit and the second security circuit determine the authenticity of the second connector when the second connector is brought into contact with the first connector for engagement purposes. Once the authentication is performed, the second connector is securely engaged with the first connector and thereby the bicycle is anchored. The security circuits are also configured to detect the type of anchoring device used to tether the bicycle, and a communication system provides information on the type of the anchoring device to the external system. The electronic security system includes one or more of various modules such as RFID module, Bluetooth module communicably coupled to the user device for locking and/or unlocking the electronic security system.

FIG. 1 shows an example representation of an environment 100, where at least some embodiments of the present disclosure can be implemented. The environment 100 shows a bicycle 105 in a tethered state. In the tethered state, the bicycle 105 is tethered to a dock 115 using an electronic security system 110 disposed on a frame such as a frame 140 of the bicycle 105. The electronic security system 110 may be tethered to the dock 115 using a variety of anchoring devices that are described later. The electronic security system 110 protects the bicycle 105 from theft, and is communicably linked with a user 125. The user 125 may have one or more devices such as a user device 120. Examples of the user device 120 are not limited to mobile phones only, and that the user device 120 may take examples of any portable electronic device (e.g., laptops, smartphones and tablets) having cellular communication capabilities. For instance, the user device 120 may be equipped with subscriber identity module (SIM) or Removable User Identity Module (R-UIM) to enable cellular communication.

In a tethered state, the electronic security system 110 sends tethering data based on a type of anchoring device used with the electronic security system 110, to an external system. The external system is at least one of an external server (such as a sever 135) of an insurance provider or even the user device 120 associated with the user 125 of the bicycle 105. This data is transmitted to the server 135 over a network 130. The network 130 may be a centralized network or may include a plurality of sub-networks that may offer a direct or indirect communication between the electronic security system 110 and the server 135 and communication between the electronic security system 110 and the user device 120. Examples of the network 130 include, but are not limited to, the Internet, local area network (LAN), wide area network (WAN), wireless, wired, and the like.

The server 135 may be located at one place or may be distributed at multiple locations. The server 135 is configured to receive tethering data from such electronic security systems (e.g., the electronic security system 110) used by various users. Information related to tethering data of the bicycle 105 can be retrieved by Insurance companies for determining insurance premiums or for determining awards in case of theft of the bicycle 105. Various components of the electronic security system 110 are described with reference to FIGS. 2 to 7.

Figure 2A:
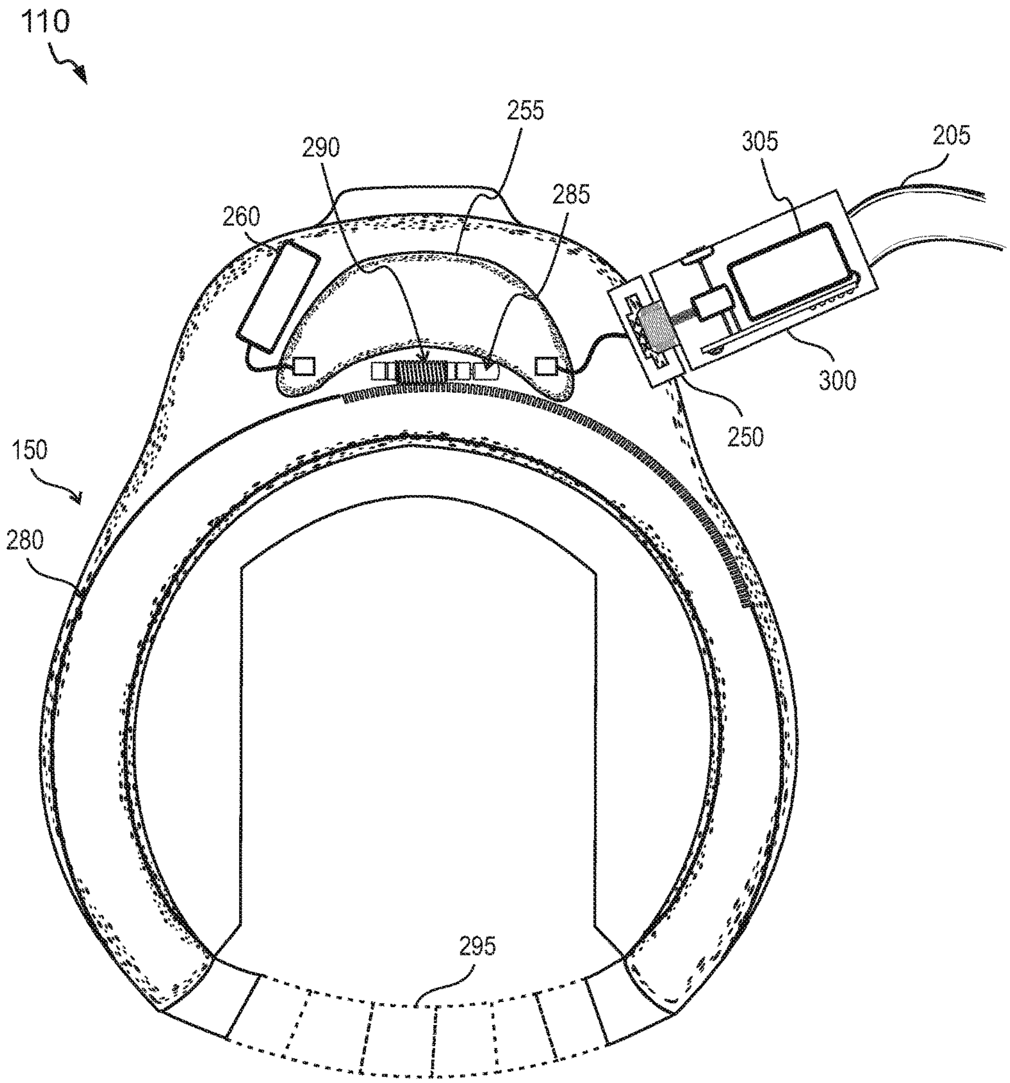
FIG. 2A illustrates a simplified schematic diagram of an electronic security system, in accordance with an example embodiment of the present disclosure.

FIG. 2A illustrates a simplified schematic representation of the electronic security system 110, according to an example embodiment of the present disclosure. The electronic security system 110 includes an electronic security device 150, a first connector 250 embedded within the electronic security device 150, and a second connector 300 connected to an anchoring device 205 (not shown in entirety).

The electronic security device 150 is disposed on a frame (see, frame 140) of a bicycle such as the bicycle 105. It must be noted that the electronic security device 150 can be disposed on any frame of the bicycle 105 as long as the electronic security device 150 is able to immobilize the bicycle 105 in a locked state of the electronic security device 150. The electronic security device 150 includes a first rechargeable battery 260, a first security circuit 255 and an integrated wheel lock 280. In an embodiment, the first security circuit 255 is a printed circuit board assembly. The first rechargeable battery 260 acts as a power source for the electronic security device 150. In an embodiment, the battery 260 may also electro-mechanically operate the wheel lock 280 to immobilize wheels of the bicycle 105.

The wheel lock 280 is disposed on relatively lower portion of the electronic security device 150. The wheel lock 280 is configured to assume an open position and a locked position. In the locked position, the wheel lock 280 restricts motion of the wheel of the bicycle 105 and there is no such restriction in the open position of the wheel lock 280. The wheel lock 280 may be configured in a variety of ways. For instance, in the illustrated embodiment, the wheel lock 280 includes a motor 285, a worm gear 290 and a locking shackle 295. The motor 285 is powered by the battery 260 and is configured to provide rotational motion to the worm gear 290. The worm gear 290 is configured to actuate motion of the locking shackle 295, through worm threads of predetermined length disposed on a portion of circumference of the locking shackle 295. In one non-limiting implementation, the wheel lock 280 is in the locked position (restricting cycle movement) when the locking shackle 295 moves in a clockwise direction, and movement of the locking shackle 295 in an anti-clockwise direction opens the locking shackle 295 keeping the wheel lock 280 in the open position. Alternatively, the locking shackle 295 can be configured to open (open position) when the locking shackle 295 moves in clockwise direction and the locking shackle 295 can be configured to close (closed position) when the locking shackle 295 moves in anti-clockwise direction.

In an embodiment, the first connector 250 is disposed in the electronic security device 150. In another embodiment, the first connector 250 can be disposed anywhere on the frame of the bicycle 105. The first connector 250 entails a port connection to the first rechargeable battery 260 of the electronic security device 150 (refer FIG. 2A). The first connector 250 includes an engagement member (e.g., a first engagement member 270 shown in FIG. 3) that is configured to be disengageably engaged with corresponding complementary engagement member of the second connector 300. An example of the complementary engagement member is a second engagement member 315 described with reference to FIG. 4A to 4C. The second engagement member 315 is configured to engage with the first engagement member 270 for charging the first rechargeable battery 260 by a rechargeable battery contained within the second connector 300. An example of the rechargeable battery is a second rechargeable battery 305 described with reference to FIG. 4A to 4C. In an embodiment, the first connector 250 is a female connector (herein interchangeably referred to as the 'female connector 250') and the second connector 300 is a male connector (herein interchangeably referred to as the 'male connector 300'). Alternatively, the first connector 250 can be a male connector and the second connector 300 can be a female connector disposed on the dock 115. It should be noted that such examples of the first connector 250 and the second connector 300 as male/female connector should not limit the scope of the present invention, and they can be configured vice versa.

Figure 2B:
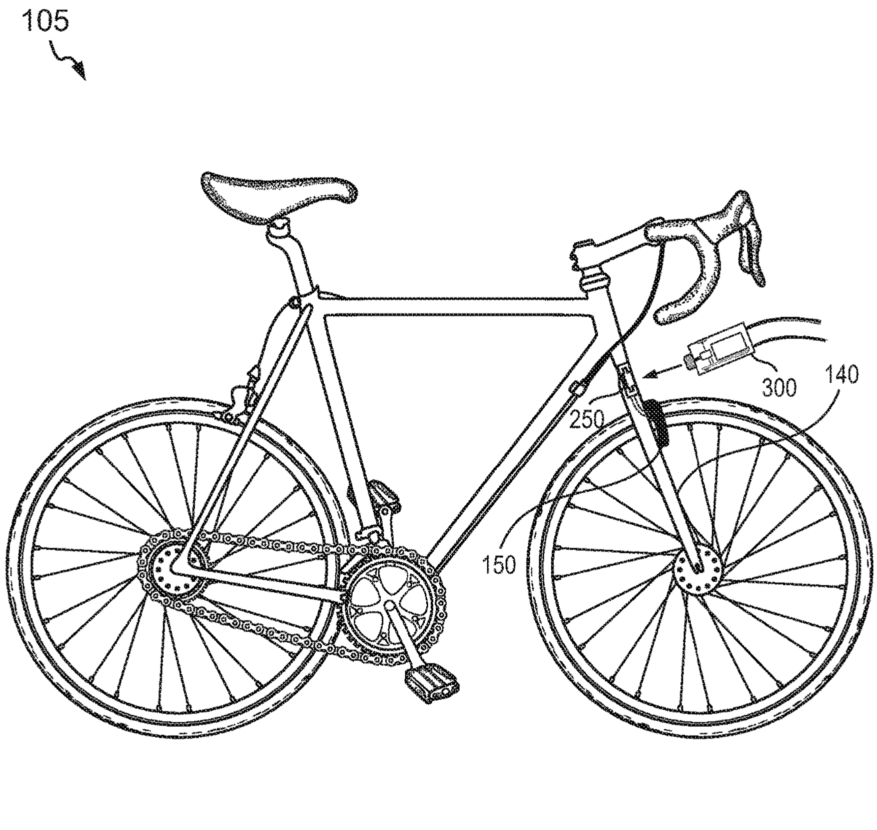
FIG. 2B illustrates a schematic representation of an electronic security system in a bicycle, in accordance with another example embodiment of the present disclosure.

Referring now to FIG. 2B, an electronic security system fitted on the bicycle 105 is illustrated in accordance with another example embodiment of the present disclosure. The electronic security system includes an electronic security device 150, a first connector 250 and a second connector 300. The electronic security device 150 includes a first rechargeable battery (not shown in FIG. 2B) for powering the electronic security device 150 and is disposed on the frame 140 of the bicycle 105 for securing the bicycle 105. The first connector 250 is disposed on the frame 140 of the bicycle 105 and is electrically coupled (not shown in FIG. 2B) to the electronic security device 150. The second connector 300, including the second rechargeable battery (e.g., the rechargeable battery 305 shown in FIGS. 4A-4C), is configured to engage with the first connector 250 to charge the first rechargeable battery using the second rechargeable battery.

Figure 3:
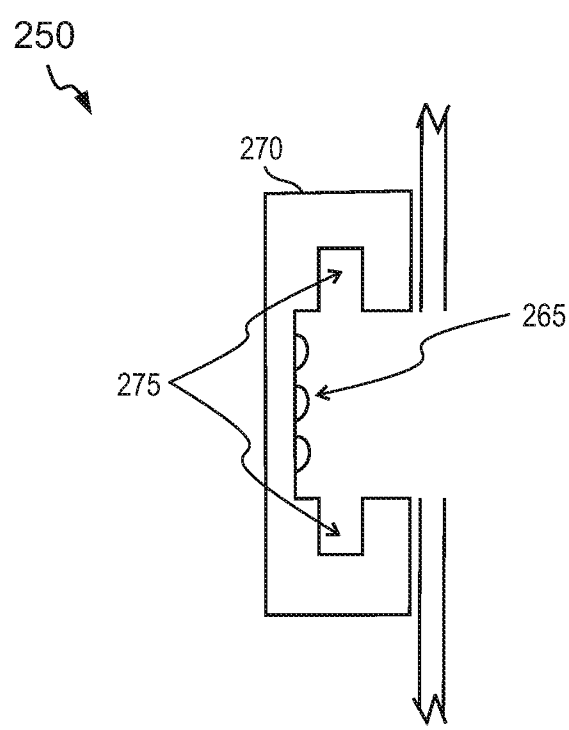
FIG. 3 illustrates schematic representation of a first connector, in accordance with an example embodiment of the present disclosure.

FIG. 3 illustrates a schematic representation of the first connector (or the female connector) 250, according to an example embodiment of the present disclosure. In an embodiment, the female connector 250 is disposed in the electronic security device 150. Alternatively, the female connector 250 can be built into or on the frame such as the frame 140 of the bicycle 105 at any of the suitable locations. In an embodiment, the female connector 250 can be built into a bicycle docking station, such as, the dock 115 (shown in FIG. 1). The female connector 250 entails a port connection to a first rechargeable battery, such as, the first rechargeable battery 260 inside the electronic security device 150. The female connector 250 is a ball bearing type connector. The female connector 250 includes the first engagement member 270 and a plurality of pin connectors 265. In an embodiment, each of the plurality of pin connectors 265 is a pogo pin connector. The first engagement member 270 includes one or more notches 275 configured to accept a male connector, such as, the male connector 300 of ball bearing type connector. The notches 275 may be provided on two or more sides of the first engagement member 270 to accommodate corresponding ball bearings of the male connector (shown in FIGS. 4A-4C).

At least some example embodiments of the male connector 300 are hereinafter described with reference to FIGS. 4A-4C. The connector 300 includes a first end portion 300*a*, a second end portion 300*b* and the second rechargeable battery 305 disposed between the first end portion 300*a* and the second end portion 300*b*. The second rechargeable battery 305 is removably positioned within the male connector 300, such that the second rechargeable battery 305 can be removed for external charging. The second rechargeable battery 305 is configured to recharge the first rechargeable battery 260 of the electronic security device 150 when the male connector 300 is engaged with the female connector 250. The rechargeable battery 305 may be any suitable battery such as Lithium ion (Li-ion) battery, Lithium polymer (Li-Po) battery, a Nickel metal hydride battery, or any other secondary battery. The male connector 300 includes a second engagement member 315 disposed on the first end portion 300*a* for engaging with complementary engagement member (e.g., first engagement member 270) of the female connector 250. The second end portion 300*b* is configured to be connected to an anchoring device that may be one of a plurality of types of the anchoring devices (such as a chain, a cable or a foldable lock) for tethering the bicycle 105. It should also be understood that if the user may not want to carry anchoring device (tethering means), the male connector 300 can also be used as a battery pack (a power bank) for charging the rechargeable battery 305.

Figure 4A:
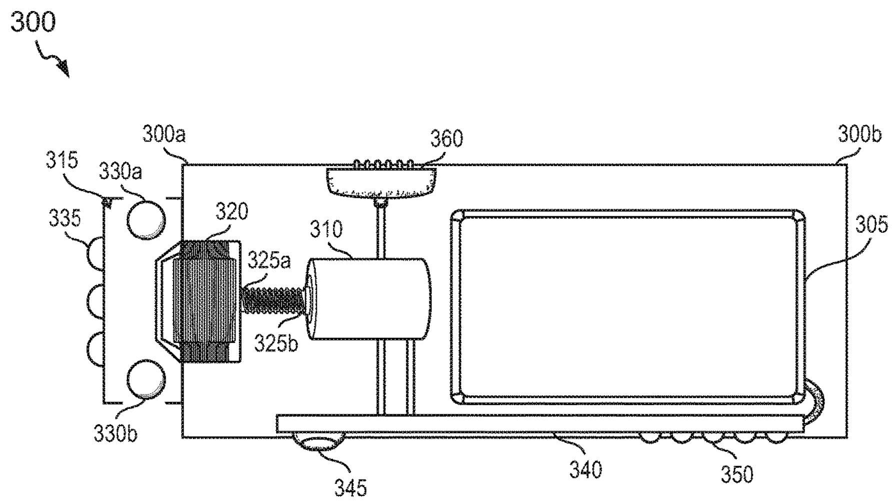
FIG. 4A illustrates schematic representation of a second connector, in accordance with an example embodiment of the present disclosure.
Figure 4B:
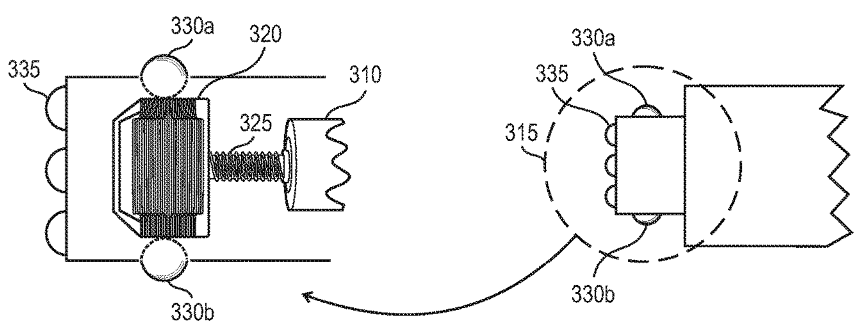
FIG. 4B illustrates a front portion of the second connector showing engagement member and an enlarged representation thereof, in accordance with an example embodiment of the present disclosure.

Referring to FIGS. 4A to 4B, the male connector 300 includes a motor 310, a push rod 320, a lead screw 325, a second security circuit 340, a push button 345, LED lights 350, a communication module 355 and a pod charger 360. The pod charger 360 is configured to charge the second rechargeable battery 305. In an embodiment, the pod charger 360 includes pogo pin connectors for connecting to an external power source. Alternatively, the pogo pin connectors can charge through a USB, Micro-USB, USB-C or similar connectors. The second security circuit 340 and the first security circuit 255 (present in the electronic security device 150) detect and verify authenticity of the male connector 300 and are configured to send a message to the external system (e.g., user device 120 or server 135) specifying the type of anchoring device connected to the second end portion 300*b* of the male connector 300. Some examples of the anchoring devices are described with reference to FIGS. 6A to 6D. In an embodiment, the second security circuit 340 is a printed circuit board assembly.

The motor 310 provides rotational motion to the lead screw 325 on actuation. A first end portion 325*a* of the lead screw 325 is coupled to the motor 310 and the second end portion 325*b* is coupled to the push rod 320. A rotation of the lead screw 325 actuates the push rod 320, and the motion of the push rod 320 actuates the second engagement member 315 to engage or disengage with the first engagement member 270 of the female connector 250.

Figure 4C:
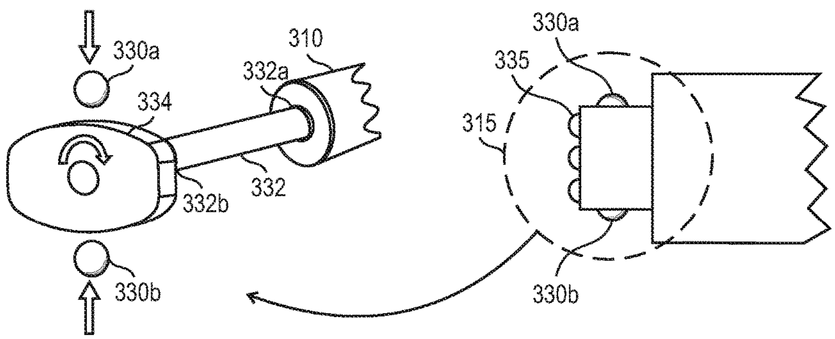
FIG. 4C illustrates a front portion of the second connector showing engagement member and an enlarged representation thereof, in accordance with another example embodiment of the present disclosure.
Figure 4D:
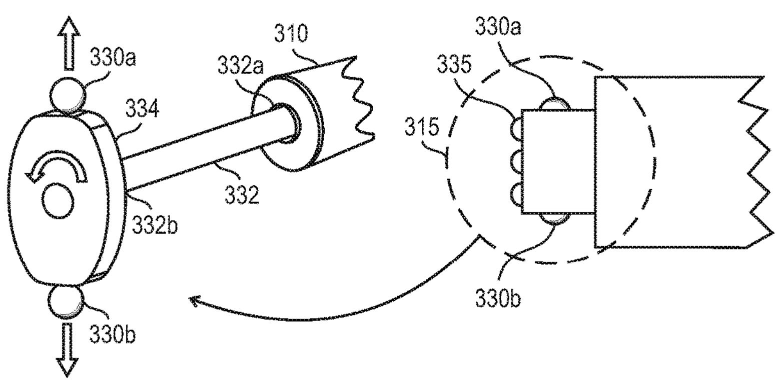
FIG. 4D illustrates a front portion of the second connector showing engagement member and an enlarged representation thereof, in accordance with yet another example embodiment of the present disclosure.

Referring now to FIGS. 4C-4D, a front portion of the second connector 300 showing the second engagement member 315 and an enlarged representation thereof are illustrated in accordance with another example embodiment of the present disclosure. In this embodiment, the male connector 300 includes a shaft 332 that is coupled to the motor 310. For instance, the shaft 332 has a first end 332*a* and a second end 332*b*, where the first end 332*a* is connected to the motor 310. The connector 300 also includes a cam 334 connected to the second end 332*b* of the shaft 332. The motor 310 turns the shaft 332 thereby rotating the cam 334. The cam 334 has a profile such that one quarter turn of the cam 334 pushes (for example, as shown in FIG. 4D) the ball bearings 330*a* and 330*b* of the second engagement member 315 away so as to engage with the first engagement member 270. The ball bearings 330*a* and 330*b* move into corresponding notch 275 of the first connector 250 thereby establishing an electro-mechanical contact between the first connector 250 and the second connector 300.

Figure 4E:
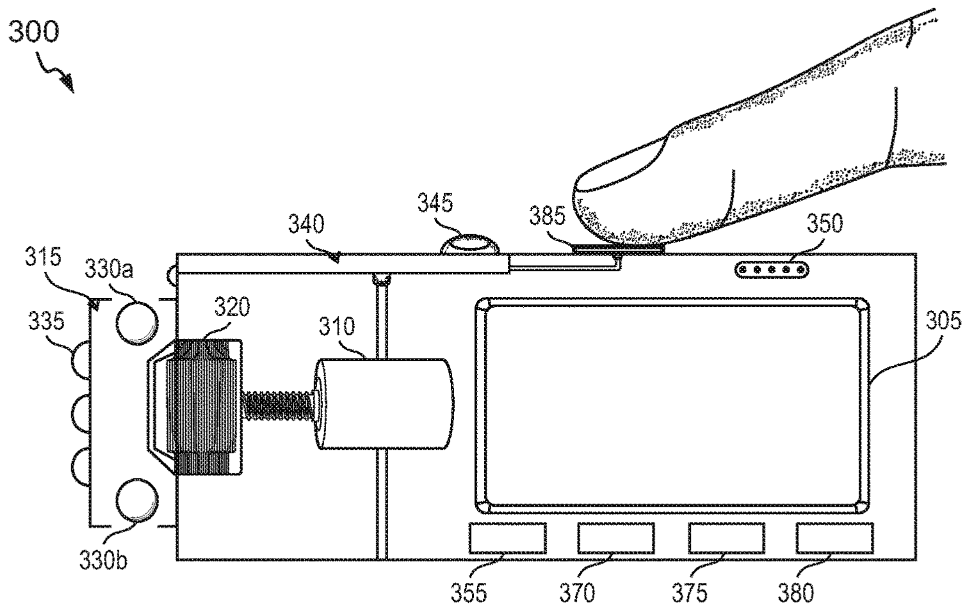
FIG. 4E illustrates a schematic representation of components of the second connector, in accordance with another example embodiment of the present disclosure.

Referring now to FIG. 4E, a schematic representation of components of the second connector 300 is illustrated in accordance with another example embodiment of the present disclosure. The second connector 300 includes LED lights 350 that are configured to be switched ON by pressing push button 345. The LED lights 350 provide visibility in a dark environment when switched ON. In an embodiment, the LED lights 350 are also configured to display level of charge on the second rechargeable battery 305. The communication module 355 is configured to relay the data corresponding to the type of anchoring device (i.e. a chain, cable or foldable lock) coupled to the second end portion 300*b* to a server such as the server 135. The male connector 300 further includes an identifier tag 370, a pairing module 375 and a location service module 380. The identifier tag 370 disposed on the male connector 300 is communicably coupled to the user device 120 and allows access to the second connector 300 for locking and unlocking the electronic security device 150. Examples of the identifier tag 370 may include but not limited to RFID tags or may employ techniques such as barcode or quick response code. The pairing module 375 is securely paired with the user device 120 through at least one of a Global System for Mobile Communication (GSM) protocol, Long Term Evolution (LTE) protocol, Bluetooth protocol or narrowband communication protocol for actuating the male connector 300 to engage/disengage from the female connector 250. For example, the pairing module 375 is securely paired with a Bluetooth module of the user device 120 for actuating the male connector 300 to disengage from the female connector 250. The actuation of the male connector 300 activates the motor 310 that provides rotation motion to the lead screw 325 or the shaft 332. The location service module 380 is configured to determine location data and provide the location data to the user device 120.

The second connector 300 includes a biometric sensor module 385 (shown in FIG. 4E) that is electrically coupled to the second security circuit 340. In an embodiment, the biometric sensor module 385 is configured to authenticate identity of the user (e.g., user 125) accessing the male connector 300 for engaging/disengaging the male connector 300 and the female connector 250. For instance, one or more fingerprints of the user are acquired in prior and stored for verification when the user tries to access the male connector 300. When the user intends to disengage (or engage) the male connector 300 from the female connector 250, the user places his/her fingerprint on the biometric sensor module 385 (shown in FIG. 4E). On authentication of the user's identity (based on the fingerprint), the second security circuit 340 actuates the motor 310. The motor 310 provides rotational motion to the lead screw 325 that moves the push rod 320 coupled to the lead screw 325 to actuate the second engagement member 315 (of the male connector 300) to engage or disengage with the first engagement member 270 of the female connector 250.

Figure 5:
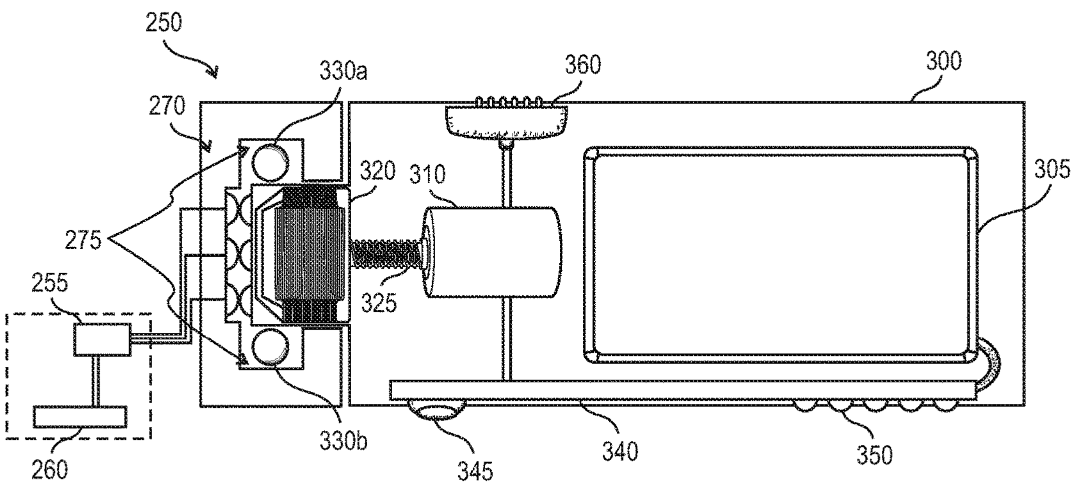
FIG. 5 illustrates a simplified schematic representation of engagement of the first connector and the second connector of the electronic security system, in accordance with an example embodiment of the present disclosure.

As shown in FIG. 4B, the second engagement member 315 includes a plurality of pin connectors 335 and one or more ball bearings 330*a*, 330*b*. In an embodiment, each of the pin connectors 335 is a pogo pin connector. The ball bearings 330*a* and 330*b* are engagement provisions for sliding into the notches 275 of the female connector 250. The ball bearings 330*a* and 330*b* are configured to protrude from the second engagement member 315 and move into the notches 275 of the female connector 250, thereby electro-mechanically locking the male connector 300 and the female connector 250 configured within the electronic security device 150 or on the frame (e.g., the frame 140) of the bicycle 105. One simplified schematic representation of engagement (locked state) of the male connector 300 and the female connector 250 of the electronic security device 150 is shown in FIG. 5, in accordance with an example embodiment of the present disclosure. When the pin connectors 265 of the female connector 250 and the pin connectors 335 of the male connector 300 come in contact with each other, the first security circuit 255 and the second security circuit 340 verify the authenticity of the male connector 300 and detect the type of anchoring device attached to the second end portion 300*b* of the male connector 300. Thereafter, an information of the type of the anchoring device that is currently used, is provided to the external system.

Upon authentication, the motor 310 is activated thereby rotating the lead screw 325. The translational motion of the lead screw 325 is transferred to the push rod 320 thereby allowing the push road 320 to move forward. The forward motion of the push rod 320 pushes the ball bearings 330*a*, 330*b* outward and the ball bearings 330*a*, 330*b* protrude from the second engagement member 315. The ball bearings 330*a*, 330*b* that are protruding from the second engagement member 315 move into the notches 275 of the female connector 250, thereby establishing the electro-mechanical locking between the male connector 300 and the electronic security device 150. Alternatively, in the configurations shown in FIGS. 4C and 4D, a rotation of the motor 310 causes the shaft 332 to rotate which thereby rotates the cam 334, and due to the profile of the cam 334, the ball bearings 330*a*, 330*b* are pushed into the notches 275 of the female connector 250.

When the pin connector 335 of the male connector 300 and the pin connector 265 of the female connector 250 are in an engaged state, the second rechargeable battery 305 of the male connector 300 charges the first rechargeable battery 260 of the electronic security device 150. To unlock the electronic security device 150, the male connector 300 has to be actuated to disengage. In an embodiment, the male connector 300 is actuated to disengage from the female connector 250 through the pairing module 375 (shown in FIG. 4E). The pairing module 375 implements at least one of a Bluetooth protocol, GSM protocol, LTE protocol or narrowband communication protocol. For instance, the male connector 300 is actuated to disengage by establishing a secure Bluetooth pairing between the electronic security device 150 and the user device 120. Once the devices are paired, the user (e.g., user 125) sends an unlock call from an associated user device such as the user device 120 to the electronic security device 150. On receiving the unlock call, the motor 310 is actuated to retract the ball bearings 330*a*, 330*b* back into the male connector 300 and the user is able to remove the male connector 300 from the electronic security device 150.

Figure 6A:
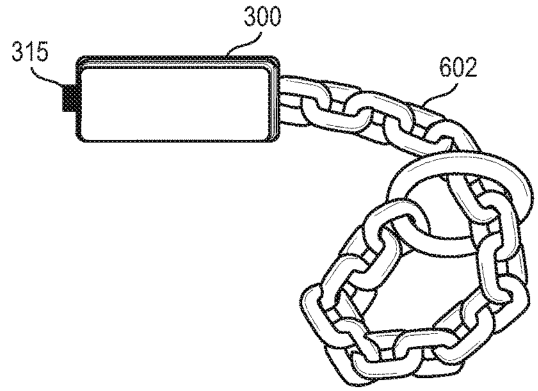
FIG. 6A illustrates a schematic configuration of the second connector connected to a first anchoring device, in accordance with an example embodiment of the present disclosure.
Figure 6B:
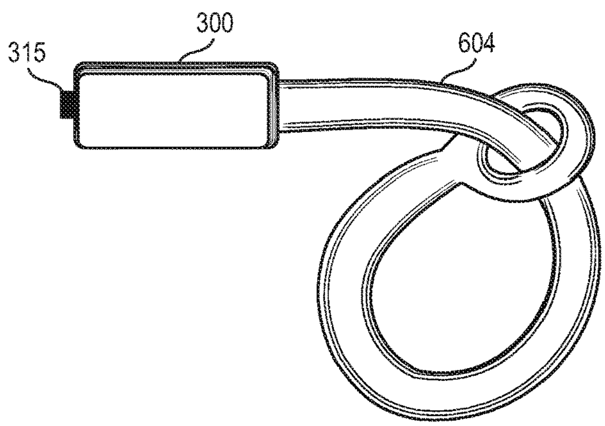
FIG. 6B illustrates a schematic configuration of the second connector, connected to a second anchoring device, in accordance with another example embodiment of the present disclosure.
Figure 6C:
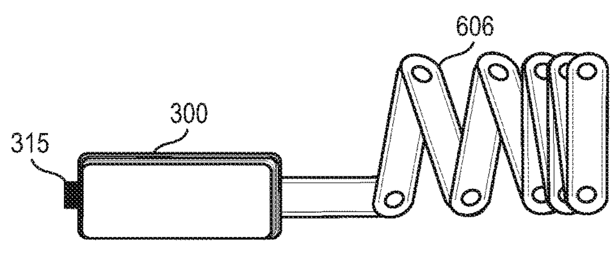
FIG. 6C illustrates a schematic configuration of the second connector, connected to a third anchoring device, in accordance with another example embodiment of the present disclosure.
Figure 6D:
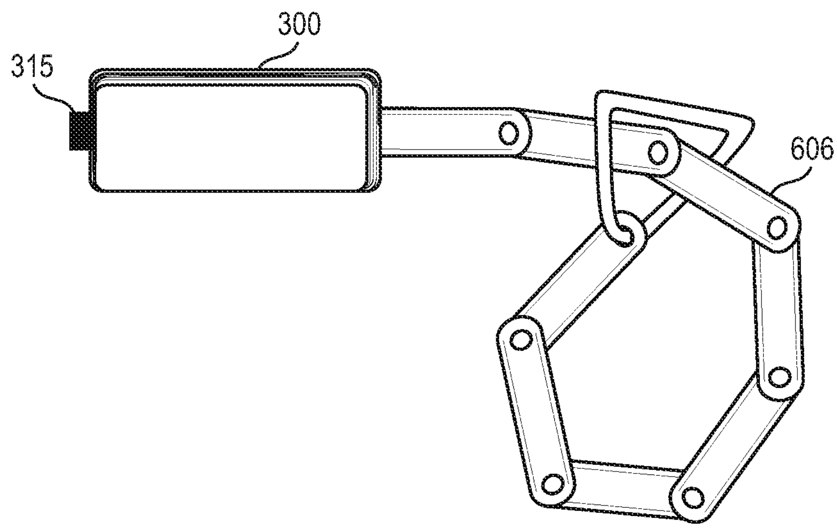
FIG. 6D illustrates another schematic configuration of the second connector connected to the fourth anchoring device, in accordance with another example embodiment of the present disclosure.

Referring now to FIGS. 6A-6D, various configurations of anchoring device coupled to the second connector 300 are shown. FIG. 6A represents a noose ended chain 602 coupled to the second portion 300*b* of the connector 300 for tethering the bicycle 105 (shown in FIG. 1) to a docking station such as the dock 115. As shown in FIG. 6B, a noose ended cable 604 is configured to couple the second portion 300*b* of the second connector 300 to the dock 115 for tethering the bicycle 105. FIG. 6C represents a noose ended folding lock 606 in a retracted state coupled to the second portion 300*b* of the second connector 300 for tethering the bicycle 105 to the dock 115. FIG. 6D represents the noose ended folding lock 606 in an expanded state.

Figure 6E:
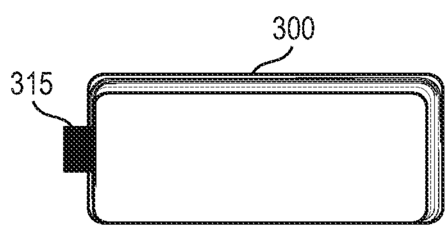
FIG. 6E illustrates a configuration of the second connector where the second connector is a battery pack, in accordance with an example embodiment of the present disclosure.

FIG. 6E represents the second connector 300 that is not connected to any anchoring device. In this configuration, the second connector 300 acts as a battery pack for recharging the second rechargeable battery 305 disposed in the electronic security device 150. For instance, when the user 125 has a need of charging the battery 305 of the electronic security device 150, the user engages the second connector 300 to the first connector 250 of the electronic security device 150 to charge the battery 305. Also, the user 125 can carry the second connector 300, which is portable, home to recharge the battery 305 inside the second connector 300 using a power supply outlet at home.

Figure 6F:
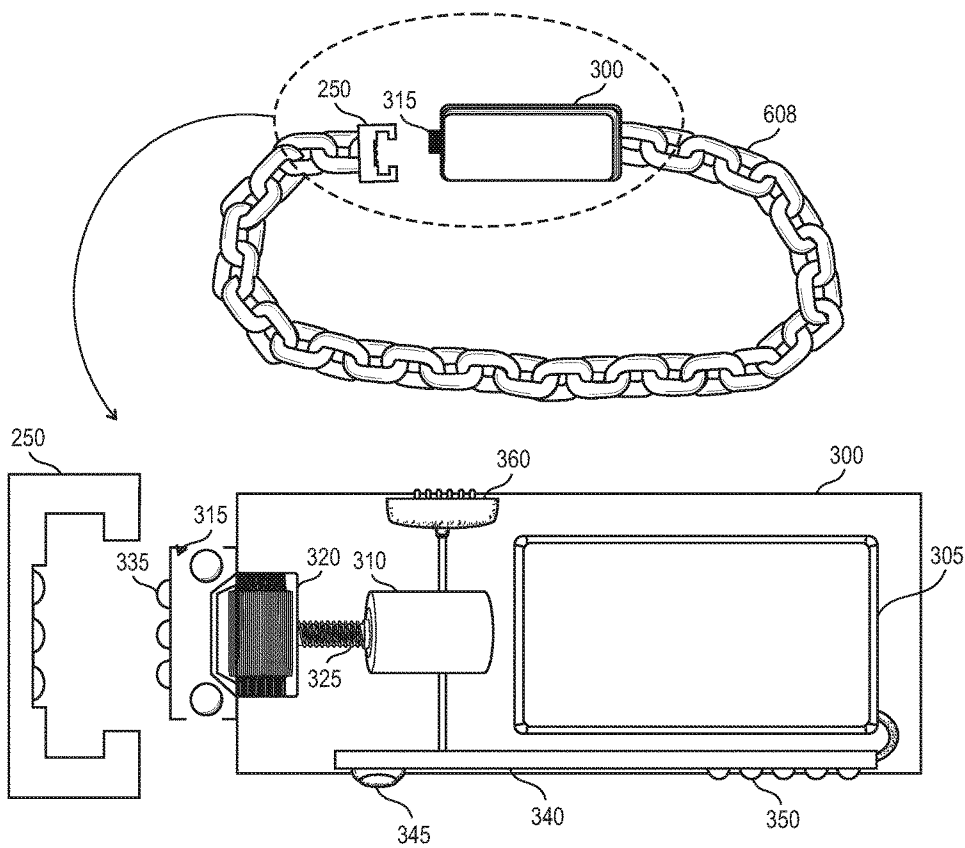
FIG. 6F illustrates a configuration of an anchoring device where the first connector and the second connector are configured on opposite ends of the anchoring device, in accordance with an example embodiment of the present disclosure.

Referring now to FIG. 6F, a configuration of an anchoring device 608 where the anchoring device 608 includes the first connector 250 and the second connector 300 on opposite ends of the anchoring device 608, is illustrated in accordance with an example embodiment of the present disclosure. The anchoring device 608 has a first end 610*a* and a second end 610*b* opposite to the first end 610*a*. The first connector 250 is coupled at the first end 610*a* of the anchoring device 608 and the second connector 300 at the second end 610*b* of the anchoring device 608. The anchoring device 608 can be used with various embodiments of the electronic security device 150 disclosed herein and/or any suitable docking station. In an embodiment, the anchoring device 608 can have a port (e.g., USB port) that can be connected to another port of the electronic security device 150 for charging the battery (e.g., the first rechargeable battery 260) of the electronic security device 150 from the second rechargeable battery 305 present inside the anchoring device 608.

Figure 7:
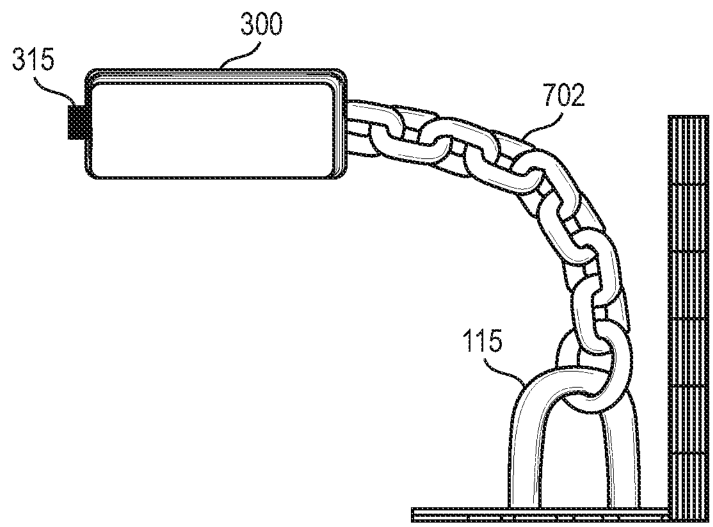
FIG. 7 illustrates a connection between the second connector and a docking station, in accordance with an example embodiment of the present disclosure.

FIG. 7 represents the second connector 300 connected to the docking station or the dock 115. The dock 115 is a stationary fixture or a rack configured to hold the second connector 300 via the anchoring device 702, such as a chain, cable or foldable lock disposed at the second end portion 300*b* of the second connector 300.

Various embodiments of the present disclosure advantageously provide an electronic security system that provides an effective means for charging the electronic security device. Further, the electro-mechanical locking between the electronic security device and the male connector provides efficient security to the bicycle. Furthermore, the male connector is designed such that it can be coupled to different types of locks. Moreover, the electronic security device notifies the user and/or servers about the type of connection used to tether the bicycle. Insurance provides can access the servers to retrieve the type of connection used to tether the bicycle. It should also be appreciated that the embodiments of the present disclosure can be applied to the existing bicycles. The electronic security system further provides LED lights on the connector to enable easy engagement of the connector and the electronic security device in dark conditions.

While few embodiments of the present disclosure have been described above, it is to be understood that the disclosure is not limited to the above embodiments and modifications may be appropriately made thereto within the spirit and scope of the disclosure.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. An electronic security system for a bicycle, the electronic security system comprising:

an electronic security device disposed on a frame of the bicycle for securing the bicycle, the electronic security device comprising a first rechargeable battery, a wheel lock, and a first security circuit, wherein the first rechargeable battery operates the wheel lock to immobilize the bicycle, the wheel lock comprising a motor, a worm gear, and a locking shackle, the motor being powered by the first rechargeable battery to provide rotational motion to the worm gear to actuate motion of the locking shackle to move locking shackle in a position that locks the bicycle and to move locking shackle in another position that unlocks the bicycle;

a first connector disposed on the electronic security device, the first connector comprising a first engagement member; and a second connector comprising:

a first end portion and a second end portion, the second end portion configured to be connected to an anchoring device of a plurality of types of anchoring devices;

a second rechargeable battery disposed between the first end portion and the second end portion;

a second engagement member configured on the first end portion, the second engagement member configured to engage with the first engagement member for charging the first rechargeable battery by the second rechargeable battery;

a plurality of light emitting diodes that are configured to be switched ON in response to pressing of a button to provide visibility in dark environment to enable engagement of the second connector with the electronic security device via the first connector and to display level of charge on the second rechargeable battery; and a second security circuit, wherein the first security circuit and the second security circuit are configured to:

detect an anchoring device when the second engagement member engages with the first engagement member; and provide information of the anchoring device to an external system.

2. The electronic security system as claimed in claim 1, wherein the external system is at least one of:

an external server of an insurance service provider; and a user device associated with a user of the bicycle.

3. The electronic security system as claimed in claim 1, wherein the first engagement member comprises one or more notches;

wherein the second engagement member comprises one or more ball bearings movably disposed in the second engagement member; and wherein the second connector further comprises a motor configured to be actuated upon authentication of the second connector when the second connector comes in contact with the first connector, wherein upon actuation the motor enables a movement of the one or more ball bearings to engage with the one or more notches of the first engagement member thereby connecting the first connector and the second connector.

4. The electronic security system as claimed in claim 3, wherein the first security circuit and the second security circuit are configured to authenticate the second connector when the second connector comes in contact with the first connector.

5. The electronic security system as claimed in claim 3, wherein the second connector further comprises:

a lead screw comprising a first end and a second end, wherein the first end of the lead screw is coupled to the motor and rotates on actuation of the motor; and a push rod coupled to the second end of the lead screw, the push rod configured to push the one or more ball bearings of the second engagement member into corresponding notches of the one or more notches of the first engagement member for engaging the second connector with the first connector.

6. The electronic security system as claimed in claim 3, wherein the second connector further comprises:

a shaft comprising a first end and a second end, wherein the first end of the shaft is coupled to the motor and rotates on actuation of the motor; and a cam coupled to the second end of the shaft, the cam configured to push the one or more ball bearings of the second engagement member into corresponding one or more notches of the first engagement member for engaging the second connector with the first connector.

7. The electronic security system as claimed in claim 3, wherein the second connector further comprises a biometric sensor module electrically coupled to the second security circuit, the biometric sensor module configured to:

acquire fingerprint of a user for verifying identity of the user accessing the second connector; and communicate with the second security circuit to actuate the motor, upon verification of the identity of the user by the biometric sensor module.

8. The electronic security system as claimed in claim 1, wherein the second connector further comprises:

a pairing module securely paired with a user device for actuating the second connector to disengage from the first connector;

a communication module for providing information of the type of the anchoring device to an external system;

a location service module for determining location data, wherein the location data is provided to the external system;

and an identifier tag communicably coupled to the user device for identifying the second connector, the identifier tag configured to provide access to the second connector for locking and unlocking the electronic security device.

9. The electronic security system as claimed in claim 1, wherein each of the first security device and the second security device is a printed circuit board assembly.

10. The electronic security system as claimed in claim 1, wherein the plurality of anchoring devices is at least one of: a cable, a chain, and a foldable lock.

11. The electronic security system as claimed in claim 1, wherein the second connector further comprises a charging port for charging the second rechargeable battery.

12. An electronic security system for a bicycle, the electronic security system comprising:

an electronic security device disposed on a frame of the bicycle for securing the bicycle, the electronic security device comprising a first rechargeable battery, a wheel lock, and a first security circuit, wherein the first rechargeable battery operates the wheel lock to immobilize the bicycle, the wheel lock comprising a motor, a worm gear, and a locking shackle, the motor being powered by the first rechargeable battery to provide rotational motion to the worm gear to actuate motion of the locking shackle to move locking shackle in a position that locks the bicycle and to move locking shackle in another position that unlocks the bicycle;

a first connector disposed on the frame of the bicycle and not on the electronic security device, wherein the first connector is connected to the first rechargeable battery of the electronic security device via a port connection, the first connector comprising a first engagement member electrically coupled with the electronic security device; and a second connector comprising:

a first end portion and a second end portion, the second end portion configured to be connected to an anchoring device of a plurality of types of anchoring devices;

a second rechargeable battery disposed between the first end portion and the second end portion;

a second engagement member configured on the first end portion, the second engagement member configured to engage with the first engagement member for charging the first rechargeable battery by the second rechargeable battery;

a plurality of light emitting diodes that are configured to be switched ON in response to pressing of a button to provide visibility in dark environment to enable engagement of the second connector with the electronic security device via the first connector and to display level of charge on the second rechargeable battery; and a second security circuit, wherein the first security circuit and the second security circuit are configured to:

detect an anchoring device when the second engagement member engages with the first engagement member; and provide information of the anchoring device to an external system.

13. The electronic security system as claimed in claim 12, wherein the external system is at least one of:

an external server of an insurance service provider; and a user device associated with user of the bicycle.

14. The electronic security system as claimed in claim 12, wherein the first engagement member comprises one or more notches;

wherein the second engagement member comprises one or more ball bearings movably disposed in the second engagement member; and wherein the second connector further comprises a motor configured to be actuated upon authentication of the second connector when the second connector comes in contact with the first connector, wherein upon actuation the motor enables a movement of the one or more ball bearings to engage with the one or more notches of the first engagement member thereby connecting the first connector and the second connector.

15. The electronic security system as claimed in claim 14, wherein the second connector further comprises:

a lead screw comprising a first end and a second end, wherein the first end of the lead screw is coupled to the motor and rotates on actuation of the motor; and a push rod coupled to the second end of the lead screw, the push rod configured to push the one or more ball bearings of the second engagement member into corresponding notches of the one or more notches of the first engagement member for engaging the second connector with the first connector.

16. The electronic security system as claimed in claim 14, wherein the second connector further comprises:

a shaft comprising a first end and a second end, wherein the first end of the shaft is coupled to the motor and rotates on actuation of the motor; and a cam coupled to the second end of the shaft, the cam configured to push the one or more ball bearings of the second engagement member into corresponding notches of the one or more notches of the first engagement member for engaging the second connector with the first connector.

17. The electronic security system as claimed in claim 12, wherein the second connector further comprises:

a pairing module securely paired with a user device for actuating the second connector to disengage from the first connector;

a communication module for providing information of the type of the anchoring device to an external system;

a location service module for determining location data, wherein the location data is provided to the external system;

and an identifier tag communicably coupled to the user device for identifying the second connector, the identifier tag configured to provide access to the second connector for locking and unlocking the electronic security device.

18. The electronic security system as claimed in claim 12, wherein the plurality of anchoring devices is at least one of: a cable, a chain or a foldable lock.

19. An electronic security system for a bicycle, the electronic security system comprising:

an electronic security device disposed on a frame of the bicycle for securing the bicycle, the electronic security device comprising a first rechargeable battery, a wheel lock, and a first security circuit, wherein the first rechargeable battery operates the wheel lock to immobilize the bicycle, the wheel lock comprising a motor, a worm gear, and a locking shackle, the motor being powered by the first rechargeable battery to provide rotational motion to the worm gear to actuate motion of the locking shackle to move locking shackle in a position that locks the bicycle and to move locking shackle in another position that unlocks the bicycle;

a first connector disposed on the electronic security device, the first connector comprising a first engagement member; and a second connector comprising:

a first end portion and a second end portion;

a second rechargeable battery disposed between the first end portion and the second end portion;

a second engagement member configured on the first end portion, the second engagement member configured to engage with the first engagement member for charging the first rechargeable battery by the second rechargeable battery;

a plurality of light emitting diodes that are configured to be switched ON in response to pressing of a button to provide visibility in dark environment to enable engagement of the second connector with the electronic security device via the first connector and to display level of charge on the second rechargeable battery; and a second security circuit, wherein the first security circuit and the second security circuit are configured to:

authenticate the second connector to enable engagement of the second engagement member with the first engagement member.

20. The electronic security system as claimed in claim 19, wherein the second connector is a battery pack.

21. The electronic security system as claimed in claim 19, wherein the first engagement member comprises one or more notches;

wherein the second engagement member comprises one or more ball bearings movably disposed in the second engagement member; and wherein the second connector further comprises a motor configured to be actuated upon authentication of the second connector when the second connector comes in contact with the first connector, wherein upon actuation the motor enables a movement of the one or more ball bearings to engage with the one or more notches of the first engagement member thereby connecting the first connector and the second connector.

22. The electronic security system as claimed in claim 21, wherein the second connector further comprises:

a lead screw comprising a first end and a second end, wherein the first end of the lead screw is coupled to the motor and rotates on actuation of the motor; and a push rod coupled to the second end of the lead screw, the push rod configured to push the one or more ball bearings of the second engagement member into corresponding notches of the one or more notches of the first engagement member for engaging the second connector with the first connector.

23. The electronic security system as claimed in claim 21, wherein the second connector further comprises:

a shaft comprising a first end and a second end, wherein the first end of the shaft is coupled to the motor and rotates on actuation of the motor; and a cam coupled to the second end of the shaft, the cam configured to push the one or more ball bearings of the second engagement member into corresponding notches of the one or more notches of the first engagement member for engaging the second connector with the first connector.

24. The electronic security system as claimed in claim 21, wherein the second connector further comprises:

a pairing module securely paired with a user device for actuating the second connector to disengage from the first connector;

a communication module for providing information of the type of the anchoring device to an external system;

a location service module for determining location data, wherein the location data is provided to the external system;

and an identifier tag communicably coupled to the user device for identifying the second connector, the identifier tag configured to provide access to the second connector for locking and unlocking the electronic security device.

* * * * *